Patented Mar. 31, 1925.

1,532,072

UNITED STATES PATENT OFFICE.

CHARLES E. PARSONS, OF NEW YORK, N. Y., AND SAMUEL PEACOCK, OF WHEELING, WEST VIRGINIA, ASSIGNORS, BY MESNE ASSIGNMENTS, TO METAL RESEARCH CORPORATION, OF NEW YORK, N. Y., A CORPORATION OF DELAWARE.

PROCESS OF SEPARATING REDUCED IRON FROM GANGUE MATERIAL.

No Drawing.   Application filed February 2, 1924.   Serial No. 690,294.

*To all whom it may concern:*

Be it known that we, CHARLES E. PARSONS and SAMUEL PEACOCK, citizens of the United States, respectively residing at New York city, county of New York, State of New York, and Wheeling, in the county of Ohio, and State of West Virginia, have invented certain new and useful Improvements in Processes of Separating Reduced Iron from Gangue Material; and we do hereby declare the following to be a full, clear, and exact description of the invention, such as will enable others skilled in the art to which it appertains to make and use the same.

This invention relates to a process of separating reduced iron products from gangue material and has for its object to improve the procedures heretofore proposed.

With these and other objects in view the invention consists in the novel steps and combinations of steps constituting the process, all as will be more fully hereinafter disclosed and particularly pointed out in the claims.

In order that the invention may be clearly understood, it is said:—It is well known that iron oxides may be reduced to the form of elemental iron by the action of reducing gases such as natural gas, producer gas and coal gas, but due to impurities carried by the ore which must be in a finely divided condition when the pure iron product is melted it is almost sure to be contaminated to a greater or less extent. That is, in making iron of a high state of purity from iron oxides, by well known reducing gases, no difficulty is experienced in preventing at the temperatures employed any silicon, carbon or manganese, that may be present in the ore from entering the iron product, for they have little or no tendency to combine with the iron at such temperature. But iron oxide ores frequently carry sulphates, sulphides and phosphates in appreciable quantities, and when these compounds come into contact with molten pure iron the conditions are different, for the sulphides will dissolve in the iron and a trace of sulphur from the sulphates and a trace of phosphorus from phosphates may be reduced by the pure iron and thus take on a form which will readily enter the pure iron product. But these latter are comparatively minor objections to be overcome in carrying out this invention, for the proportions of the contaminants are relatively small, and may be disregarded in many uses of the pure iron, although they do constitute objections for other uses of said iron. A much more serious objection in the making of pure iron resides in the presence of iron oxide in the product. The presence of small quantities of iron oxide in the reduced product is almost always due to this compound being embedded in silica, or in a silicate in the ore, and thus protected from the action of the reducing gases. While it is true that the ground mass of ore upon reaching the magnetic separators should have this oxide removed, yet, experience shows it often is not removed due to one cause or another and its presence shows up in the reduced molten product of so called pure iron when it dissolves and causes later all sorts of trouble even if no other impurities are present. But when sulphides are also dissolved in the reduced iron product the dissolved oxides are liable to unite therewith and to increase the objections above mentioned.

Manganese oxide is not reduced by the gases to any extent under normal conditions and upon fusion of the metal with its unchanged gangue matter it may to a small extent dissolve in the reduced iron product. Carbon in the gangue matter is also detrimental.

In carrying out this invention the foregoing objections are avoided by proceeding as follows:—A reduced iron product with its impurities removed is brought to a molten condition and there is floated upon the bath thus produced a layer of a slag consisting of a basic silicate of sodium either alone or admixed with borax, or sodium bi-borate.

Another portion of the reduced iron product with only those impurities removed, as was found convenient to do so, is next passed down through this layer of basic sodium containing slag, whereupon the impurities present are found to completely dissolve in the molten sodium salt of the slag and a very fluid slag or covering for the pure iron below persists. In fact, so efficient is the purification of the pure iron product by a basic fluid slag consisting of a molten sodium salt, that it is found practical to even leave in the reduced iron product a considerable proportion of its gangue matter, or substantially all those compounds which will readily dissolve in the said sodium salt during the passage of the pure iron therethrough. Such readily soluble gangue matters are found in silica which forms a sodium silicate; in iron and manganese oxides which form sodium ferrites and manganites; in sulphides, sulphates, phosphates and carbon each of which react to form compounds which do not enter the iron. Therefore, to this end it is further found desirable to make this layer of slag say six inches or more in thickness.

It is of course essential to maintain the floating layer of sodium salts in a substantially basic state, and to this end additional sodium salts should be added from time to time, and an equivalent portion of the exhausted or nearly exhausted sodium slag should be removed by any suitable tapping means. As a temperature of about 2900° F.
is necessary to fuse highly refined iron the slag of sodium salts floating on the molten iron will have about the same temperature and will be very fluid. It is desirable to maintain a depth of this slag of more than six inches, to insure the washing effect upon the flow of reduced iron oxide and its accompanying gangue matter, as they are discharged in the melting furnace. This layer of very fluid sodium salts or slag also prevents contact of the molten iron bath with any gaseous products of the reducing reaction, and in this manner any gasification of the iron or occlusion of gas in the iron upon its fusion in said bath is absolutely prevented. This latter constitutes in itself an important feature of this process. Instead of first providing a molten bath of pure iron on which to float the above mentioned sodium containing slag, it is evident that the molten sodium salt or salts may be introduced in a suitable container or settling well and the unpurified iron previously melted may be poured in or tapped in on top of said molten slag. In such case the iron will pass down through the slag, its admixed impurities will dissolve in the slag and the latter will rise and float on top of the iron bath.

It will now be clear that this process comprises the reduction of iron ores, preferably iron oxides in any suitable manner as by reducing gases to a substantially pure iron, or to an iron not having chemically combined therewith any contaminating elements, although it may have mechanically mixed therewith a plurality of contaminating elements that are soluble in molten sodium salts. In order to prevent the chemical combination of contaminating gangue matter with the iron, the temperatures of reduction are preferably kept above 1500° F. and below 1800° F. This process also comprises providing a molten slag bath or layer of a sodium salt, such as a basic sodium silicate, a sodium bi-borate or a mixture of these and passing the solid reduced iron and its accompanying mixture of gangue material down through this slag layer, so the reduced iron may be stripped of its admixed impurities and the sodium containing slag may dissolve the same and float on top of the iron. Of course, as the sodium content of the slag is thus used up the slag is drawn off and a fresh supply of the sodium salt is tapped in on top the molten iron to maintain said slag basic. It will further be observed that any carbon that may be precipitated on the reduced iron or gangue matter by the action of the reducing gases will fail to contaminate the iron because free carbon will not combine with iron at the temperatures of reduction employed, and it will be left in the slag layer as said solid iron passes therethrough. Likewise this said layer of molten slag prevents contact of the iron after it becomes molten with gases such as air, nitrogen, carbon monoxide, hydrogen, etc., and thus prevents gasification of the molten iron.

It is obvious that those skilled in the art may vary the details of the procedure without departing from the spirit of the invention, and therefore, it is not desired to be limited to the above disclosure except as may be required by the claims.

What is claimed is:—

1. The process of producing pure iron from iron oxides which consists in subjecting said oxides in a finely divided state to the action of a reducing gas below 1800° F. and above 1500° F.; and passing the reduced solid finely divided iron thus obtained through a basic layer of a molten sodium salt capable of dissolving silica.

2. The process of producing pure iron from finely divided iron ores which consists in subjecting said ores in a finely divided state to the action of a reducing gas free from sulphur below 1800° F. and above 1500° F.; and passing the reduced solid finely divided iron thus obtained through a layer of a molten basic slag capable of dissolving silica and manganese oxide.

3. The process of producing pure iron from iron oxides mixed with gangue material which consists in subjecting said oxides in a finely divided state to the action of a reducing gas to produce reduced finely divided iron admixed with said gangue material; and passing said iron and gangue material through a molten layer containing a molten sodium salt capable of dissolving said gangue material.

4. The process of producing pure iron from finely divided iron oxides mixed with gangue material which consists in subjecting said oxides at a temperature below 1800° F. and above 1500° F. to the action of a reducing gas to produce finely divided reduce solid iron admixed with said gangue material; and passing said iron and gangue material down through a molten layer containing a molten basic sodium silicate capable of dissolving said gangue material.

5. The process of producing pure iron from iron oxides mixed with other substances which consists in subjecting said oxides in a finely divided state to the action of a reducing gas for a time sufficient to produce the desired iron; and passing said finely divided iron and associated other substances in a solid state through a basic molten layer of sodium silicate and sodium bi-borate to remove said substances.

6. The process of producing pure iron from powdered iron oxides mixed with other substances, which consists in subjecting said oxides in a finely divided state to the action of a reducing gas for a time sufficient to produce the desired iron; passing said finely divided iron and associated other substances through a molten layer containing sodium silicate and sodium bi-borate to remove said substances; and renewing said sodium compounds from time to time as they tend to become inactive in removing said other substances from the mixture.

7. The process of producing pure iron from iron oxides mixed with other substances and preventing said iron from being contaminated with gases which consists in subjecting said oxides in a finely divided state to the action of reducing gases free from sulphur for a time sufficient to produce said iron; passing said finely divided iron in a solid state associated with its gangue material through a layer of a basic slag capable of separating said iron from said gangue material into a molten bath of pure iron on which said slag floats, thus preventing any gases from entering said reduced iron when in its molten condition.

In testimony whereof we affix our signatures.

CHARLES E. PARSONS.
SAMUEL PEACOCK.